(12) United States Patent
Sakurazawa

(10) Patent No.: US 6,742,277 B2
(45) Date of Patent: Jun. 1, 2004

(54) DEVICE AND METHOD FOR DRYING NOODLES BY HOT AIR

(75) Inventor: Hatsuo Sakurazawa, Takasaki (JP)

(73) Assignee: Fuji Manufacturing Corporation Ltd. (JP)

( * ) Notice: Subject to any disclaimer, the term of this patent is extended or adjusted under 35 U.S.C. 154(b) by 0 days.

(21) Appl. No.: 10/258,988
(22) PCT Filed: May 8, 2001
(86) PCT No.: PCT/JP01/03837
§ 371 (c)(1), (2), (4) Date: Oct. 30, 2002
(87) PCT Pub. No.: WO01/84954
PCT Pub. Date: Nov. 15, 2001

(65) Prior Publication Data
US 2003/0140515 A1 Jul. 31, 2003

(30) Foreign Application Priority Data
May 12, 2000 (JP) ........................................ 2000-139276

(51) Int. Cl.⁷ ............................................... F26B 19/00
(52) U.S. Cl. .............................. 34/236; 34/623; 34/662
(58) Field of Search ........................ 34/623, 627, 662, 34/203, 230, 232, 236, 234

(56) References Cited

U.S. PATENT DOCUMENTS

| | | | | |
|---|---|---|---|---|
| 3,711,961 A | * | 1/1973 | Spiegel et al. | 34/218 |
| 4,045,882 A | * | 9/1977 | Buffington et al. | 34/171 |
| 4,253,825 A | * | 3/1981 | Fasano | 432/149 |
| 4,338,079 A | * | 7/1982 | Faulkner et al. | 432/14 |
| 4,472,887 A | * | 9/1984 | Avedian et al. | 34/496 |
| 4,683,667 A | * | 8/1987 | Laske et al. | 34/203 |

FOREIGN PATENT DOCUMENTS

| | | |
|---|---|---|
| JP | 52-136936 | 11/1977 |
| JP | 61-149061 | 7/1986 |
| JP | 1-112958 | 5/1989 |

* cited by examiner

Primary Examiner—Ira S. Lazarus
Assistant Examiner—Kathryn S. O'Malley
(74) Attorney, Agent, or Firm—Young & Basile, P.C.

(57) ABSTRACT

A hot air drying apparatus for noodles which makes possible steady production of high quality instant noodles by blowing hot air at an optimal velocity and in an optimal flow rate all over noodle ribbons to be dried in a short period of time and thereby makes a texture of noodle ribbons uniform and fine is to be provided. In a hot air drying apparatus, a conveyor runs from one end of a lengthwise direction of this apparatus to the other, and noodle ribbons carried from a preceding step riding on this conveyor move within an apparatus at a prescribed speed. The apparatus includes a plurality of drying chambers $D_1, D_2, D_3, D_4, D_5$ and so forth into which it is divided in the lengthwise direction. Each drying chamber is provided with a heater for heating air in the chamber to a set temperature, a blower fan for feeding the resultant heated air flow as a hot air flow to a lower part of the chamber where the conveyor is arranged, an air duct for guiding the hot air flow from the blower fan upwards or downwards in a widthwise direction of the conveyor, and a streamlining section for streamlining the hot air flow moving above or underneath the conveyor so that the hot air be blown down or up towards the conveyor.

3 Claims, 6 Drawing Sheets

DEVICE AND METHOD FOR DRYING NOODLES BY HOT AIR

TECHNICAL

The present invention relates to a hot air drying method and apparatus for noodles.

BACKGROUND ART

In a usual manufacturing method for instant noodles, first, a raw material such as wheat flour, buckwheat flour or starch is put into a kneading machine such as a mixer or the like and, after adding pre-conditioned kneading water, the flour and the water are kneaded for a prescribed period of time. Then, the resultant dough (noodle dough) is taken out of the kneading machine and is formed with a noodle ribboning machine into noodle ribbons, which are cut to a prescribed length. Next the cut noodle ribbons are conveyor-fed to an impasting apparatus, in which they are steamed for a prescribed length of time in a vaporous ambiance, and fed to a drying process to be deprived of their moisture. Immediately after the drying process, the noodle ribbons, after quick cooling, are put into containers, to which accompanying items are added.

As an apparatus for accomplishing the drying process, a hot air drying apparatus is known, which brings hot air of about 70 to 90° C. into contact with noodle ribbons to bring down the moisture of the noodle ribbons to about 8 to 12%. Instant noodles manufactured using this hot air drying apparatus are known as "non-fried noodles," "a(alpha) noodles" or "alphaized noodles," which, taking a little longer than other instant noodles to be restored to an edible state, taste plainer.

However, with the conventional hot air drying apparatus, it is difficult to blow hot air uniformly on the noodle ribbons which are successively fed from the steaming process. Thus, as hot air in a turbulent state comes into contact with noodle ribbons, they tend to be dried unevenly and may partly become squeezed to one another while being dried. Therefore, it is difficult to keep the drying conditions of noodle ribbons constant with any conventional hot air drying apparatus, and this difficulty poses a problem in stabilizing the quality of the instant noodles that are produced.

It is conceivable to set the drying period for noodle ribbons long enough to avoid uneven drying, but this would invite workability and productivity problems in the manufacturing process of instant noodles.

In view of these problems, the present invention is intended to provide a hot air drying method and apparatus for noodles which make possible steady production of high quality instant noodles by blowing hot air at the optimal velocity and in the optimal flow rate all over the noodle ribbons to be dried in a short period of time and thereby make the texture of the noodle ribbons uniform and fine.

DISCLOSURE OF THE INVENTION

In order to attain the above described object, according to a hot air drying method for noodles, there is provided a hot air drying method for noodles whereby the drying temperature, air flow rate and air velocity are set optimally, a laminar flow of hot air is generated, and a step to blow the hot air flow so generated uniformly on the noodle ribbons to be dried from above and a step to blow the hot air uniformly on the noodle ribbons from underneath are alternately repeated to dry the noodle ribbons for a prescribed drying period.

According to a hot air drying method for noodles as set forth in claim 2, there is provided a hot air drying apparatus for noodles wherein a plurality of drying chambers which conveyor-fed noodle ribbons consecutively pass are arrayed, each drying chamber being provided with a heater to heat air therein to generate a heated air flow, a blower for feeding the heated air flow so generated as a hot air flow, and a hot air flow streamlining device for streamlining the hot air flow fed by the blower into a laminar state, setting it to the optimal air flow rate and velocity for drying and blowing the flow uniformly on the noodle ribbons, in each pair of adjacent drying chambers the hot air flow streamlining device of one drying chamber blowing the hot air flow on the noodle ribbons from above and that of the other drying chamber blowing the hot air flow on the noodle ribbons from underneath.

According to the invention as a set forth in claim 3, there is provided a variation of the hot air drying apparatus for noodles as set forth in claim 2 in which each hot air flow streamlining device is provided with an air duct for streamlining the hot air flow fed by the blower into a primary laminar state and leading it towards above or underneath the widthwise direction of the conveyor, and a streamlining section for setting the hot air flow led by this air duct towards above or underneath the widthwise direction of the conveyor to the optimal air flow rate and velocity for drying, and controlling it into a laminar flow to be uniformly blown on the noodle ribbons.

According to the invention as set forth in claim 2, there is provided a variation of the hot air drying apparatus for noodles as set forth in claim 3 in which the air duct is a box-shaped body having an inlet for taking in the hot air flow from the blower and an outlet opening to above or underneath the widthwise direction of the conveyor, this box-shaped body having within it stratifying plates extending from the inlet to the outlet.

According to the invention as set forth in claim 3, there is provided a variation of the hot air drying apparatus for noodles as set forth in claim 3 or 2 in which the streamlining section has an air velocity control plate in which a plurality of slits are formed in parallel to one another in a direction orthogonal to the moving direction of the conveyor and a plurality of fixed air flow receiving plates rising from the air velocity control plate and spanning over the plurality of slits, wherein the plurality of air flow receiving plates are so shaped that the air receiving area of the air flow receiving plate in the closest position to the air duct be made the smallest by reducing its height and the air receiving area of each succeeding air flow receiving plate be gradually expanded as the distance of the plate from the air duct increases by gradually increasing its height, so that the hot air flow from the air duct, as it hits each air flow receiving plate, be set to the optimal flow rate, uniformly led towards the face of the air velocity control plate and, by passing the slits, controlled to the optimal velocity to be blown on the noodle ribbons.

BEST MODE FOR CARRYING OUT THE INVENTION

A hot air drying apparatus for noodles according to the present invention will be described in detail below with reference to the accompanying drawings.

Figure 1:
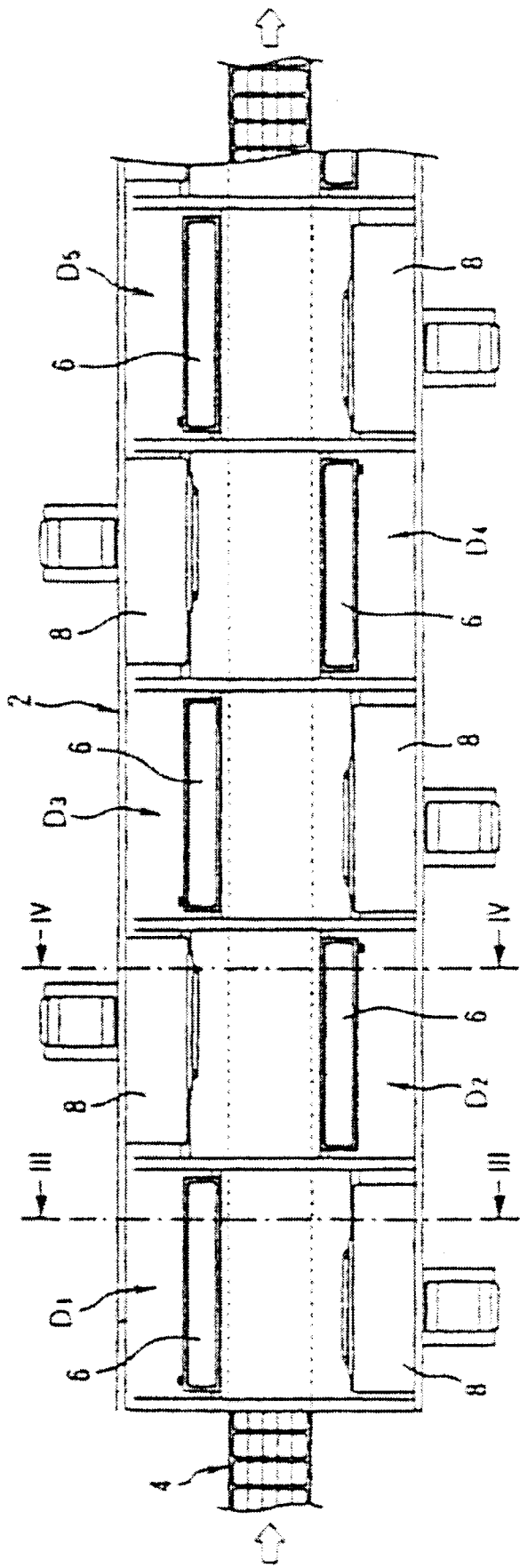
FIG. 1 shows a planar section of a hot air drying apparatus for noodles according to the present invention.
Figure 2:
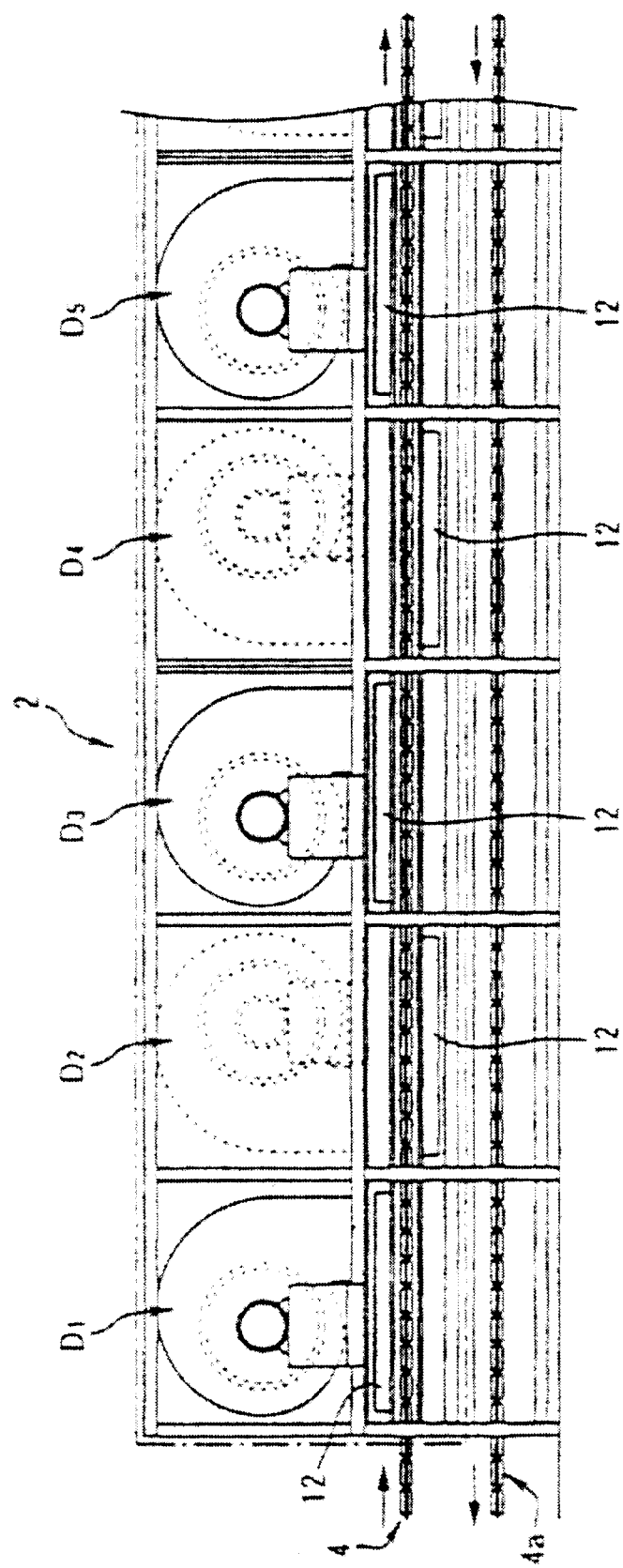
FIG. 2 shows a profile of the hot air drying apparatus for noodles.

FIG. 1 shows a planar section of a hot air drying apparatus 2 and FIG. 2, a profile of the hot air drying apparatus 2. This hot air drying apparatus 2 has an appearance of a cuboid, and a conveyor 4 runs from one end of the lengthwise direction of this apparatus to the other. Riding on this conveyor 4, noodle ribbons carried from the preceding step (which may be the steaming step, for instance) move within the apparatus at a prescribed speed.

The hot air drying apparatus 2 comprises of a plurality of drying chambers $D_1$, $D_2$, $D_3$, $D_4$, $D_5$ and so forth into which it is divided in the lengthwise direction.

Figure 3:
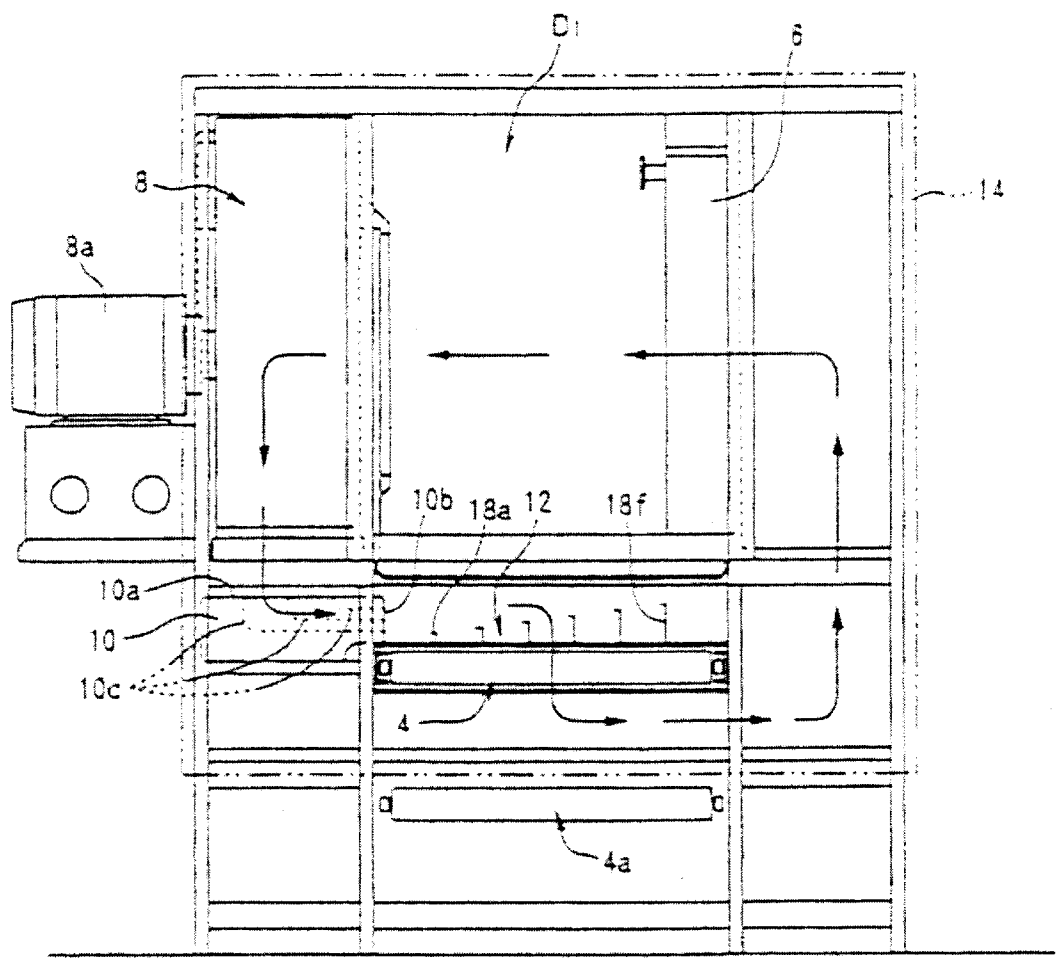
FIG. 3 is an arrow diagram of FIG. 1 cut along a III—III line view.

The first drying chamber D, counted from the left, as illustrated in FIG. 3, is provided with a heater 6 for heating the air in the chamber to a set temperature, a blower fan 8 for feeding the resultant heated air flow as a hot air flow to the lower part of the chamber where the conveyor 4 is arranged, an air duct 10 for guiding the hot air flow from the blower fan 8 upwards in the widthwise direction of the conveyor 4, and a streamlining section 12 for streamlining the hot air flow moving over the conveyor 4 so that it be blown down towards the conveyor 4. Incidentally, sign 8a denotes a fan motor, sign 4a, the returning part of the conveyor, and sign 14 assigned to a two-dot chain line, an insulating panel covering the circumference of a box-shaped body constituting the drying chamber $D_1$ to maintain the temperature in drying chamber $D_1$ at a prescribed level.

The air duct 10 is a box-shaped body provided with an inlet 10a for taking in the hot air flow from the blower fan 8 and an outlet 10b opening to above the conveyor 4, and within this box-shaped body are arranged stratifying plates 10c for converting the hot air flow in a turbulent state from the blower fan 8 into a laminar flow and leading it to the outlet 10b.

Figure 5:
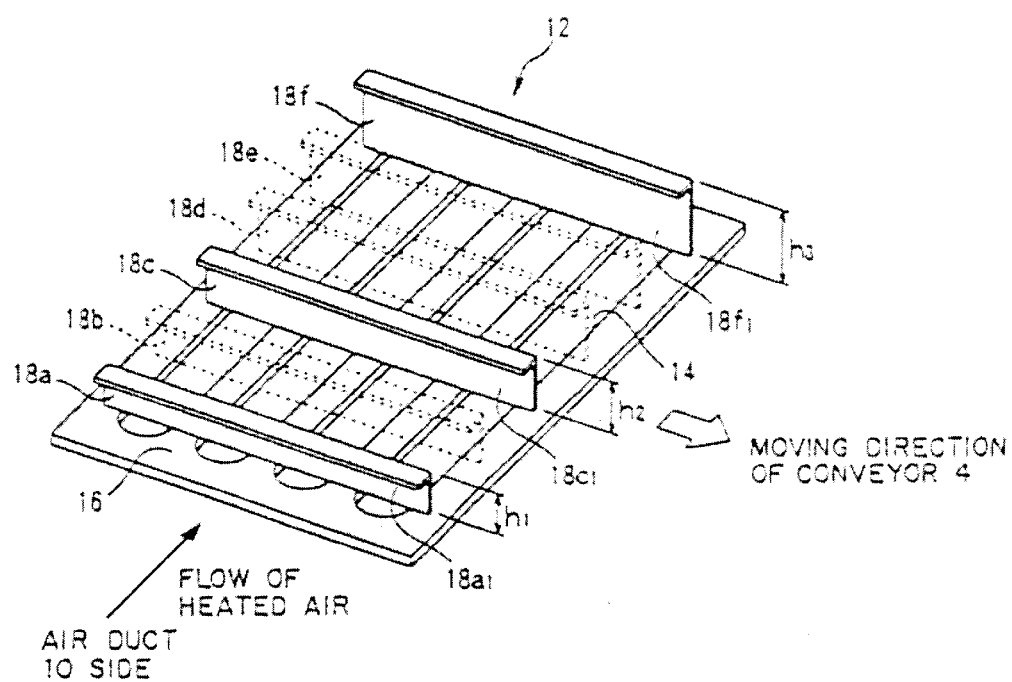
FIG. 5 shows a perspective view of the streamlining section according to the invention.

The streamlining section 12, as illustrated in FIG. 5, is a member provided with an air velocity control plate 16 in which a plurality of slits 14 are formed in parallel to one another in a direction orthogonal to the moving direction of the conveyor 4 and with a plurality of air flow receiving plates 18a through 18f spanning over the plurality of slits 14 and fixed to the upper face of the air velocity control plate 16. The plurality of air flow receiving plates 18a through 18f are configured of angles. The upright part $18a_1$ of the air flow receiving plate 18a closest to the air duct 10 is the lowest, the upright part $18f_1$ of the air flow receiving plate 18f farthest from the air duct 10 is the tallest, and the upright parts of the air flow receiving plates 18b through 18e between them are increasingly tall towards the air duct 10. Thus, there is a relationship of $h_1 < h_2 < h_3$ where $h_1$, $h_2$ and $h_3$ are respectively the heights of the upright parts $18a_1$, $18c_1$, and $18f_1$ of the air flow receiving plates 18a, 18c and 18f.

Whereas the hot air flow from the air duct 10, after hitting the upright parts of the air flow receiving plates 18a through 18f, moves on towards the air velocity control plate 16, the air receiving area of each of the upright parts of the air flow receiving plates 18a through 18f is set in such a size as enables the optimal rate of a hot air flow for the drying of noodle ribbons to uniformly cover the whole top face of the air velocity control plate 16. The shape of the plurality of slits 14 formed in the air velocity control plate 16, too, is so set that the hot air flow passing these slits 14 and moving downwards have the optimal velocity for the drying of noodle ribbons.

Figure 4:
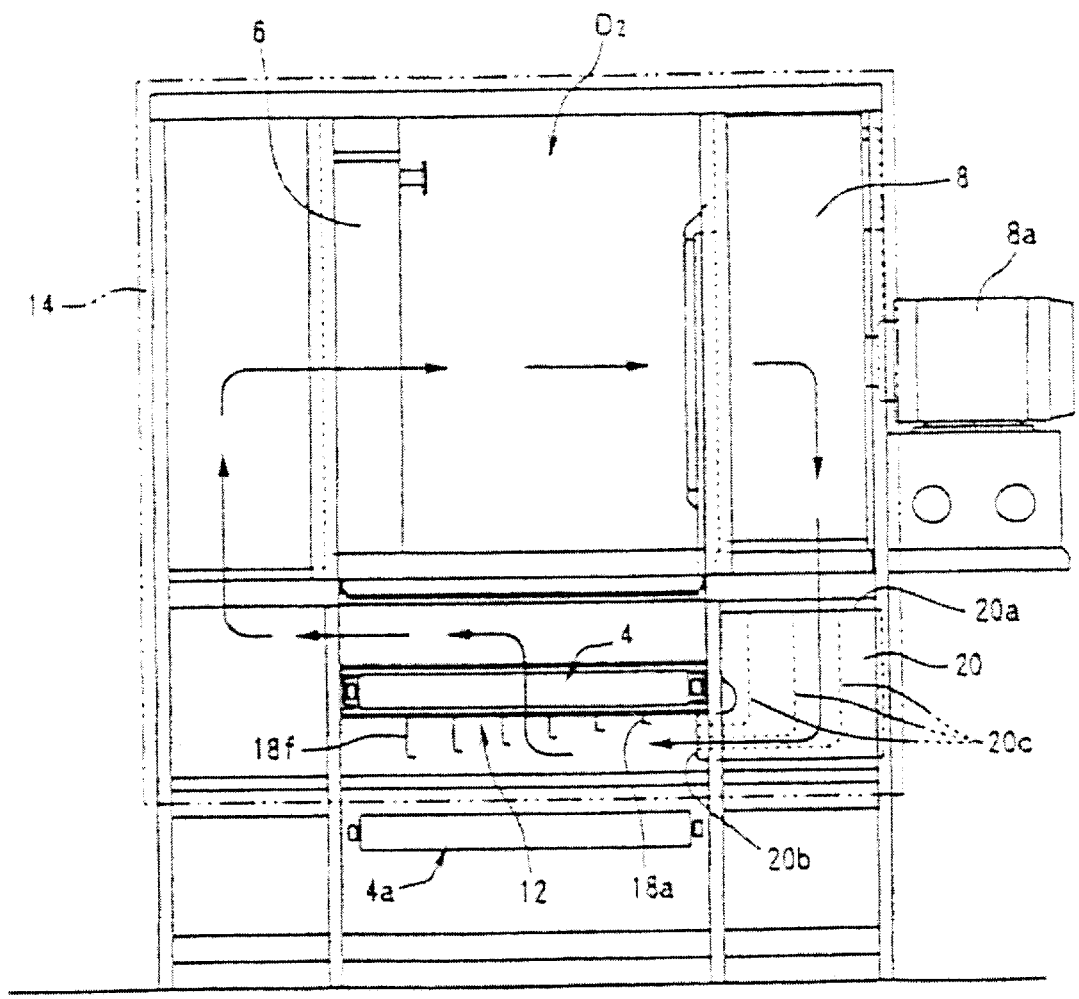
FIG. 4 is an arrow diagram of FIG. 1 cut along a IV—IV line view.

Then, the third drying chamber $D_3$ and the fifth drying chamber $D_5$ shown in FIG. 1 and FIG. 2 also have similar structures to that of this first drying chamber $D_1$. The second drying chamber $D_2$ counted from the left, as illustrated FIG. 4, is provided with a heater 6 and a blower fan 8, arranged in reverse positions to their respective counterparts in the first drying chamber $D_1$, an air duct 20 for leading the hot air flow from the blower fan 8 downwards in the widthwise direction of the conveyor 4 and a streamlining section 12 for streamlining the hot air flow flowing underneath the conveyor 4 to be blown up towards the conveyor 4.

The air duct 20 is a box-shaped body provided with an inlet 20a for taking the hot air flow from the blower fan 8 and an outlet 20b opening to below the conveyor 4, and within this box-shaped body are arranged stratifying plates 20c for converting the hot air flow in a turbulent state from the blower fan 8 into a laminar flow and leading it to the outlet 20b.

The streamlining section 12 has the arrangement of the streamlining section 12 in FIG. 3 turned upside down, wherein the upright part of the air flow receiving plate 18a closest to the air duct 20 is the lowest, the upright part of the air flow receiving plate 18f farthest from the air duct 20 is the tallest, and the upright parts of the air flow receiving plates between them are increasingly tall towards the air duct 20.

In the streamlining section 12 of this second drying chamber $D_2$, too, the hot air flow from the air duct 20, after hitting the upright parts of the air flow receiving plates 18a through 18f, moves up towards the air velocity control plate 16, and the air receiving area of each of the upright parts of the air flow receiving plates 18a through 18f is set in such a size as enables the optimal rate of a hot air flow for the drying of noodle ribbons to uniformly cover the whole bottom face of the air velocity control plate 16. The shape of the plurality of slits 14 formed in the air velocity control plate 16, too, is so set that the hot air flow passing these slits 14 and moving upwards have the optimal velocity for the drying of noodle ribbons.

Figure 6:
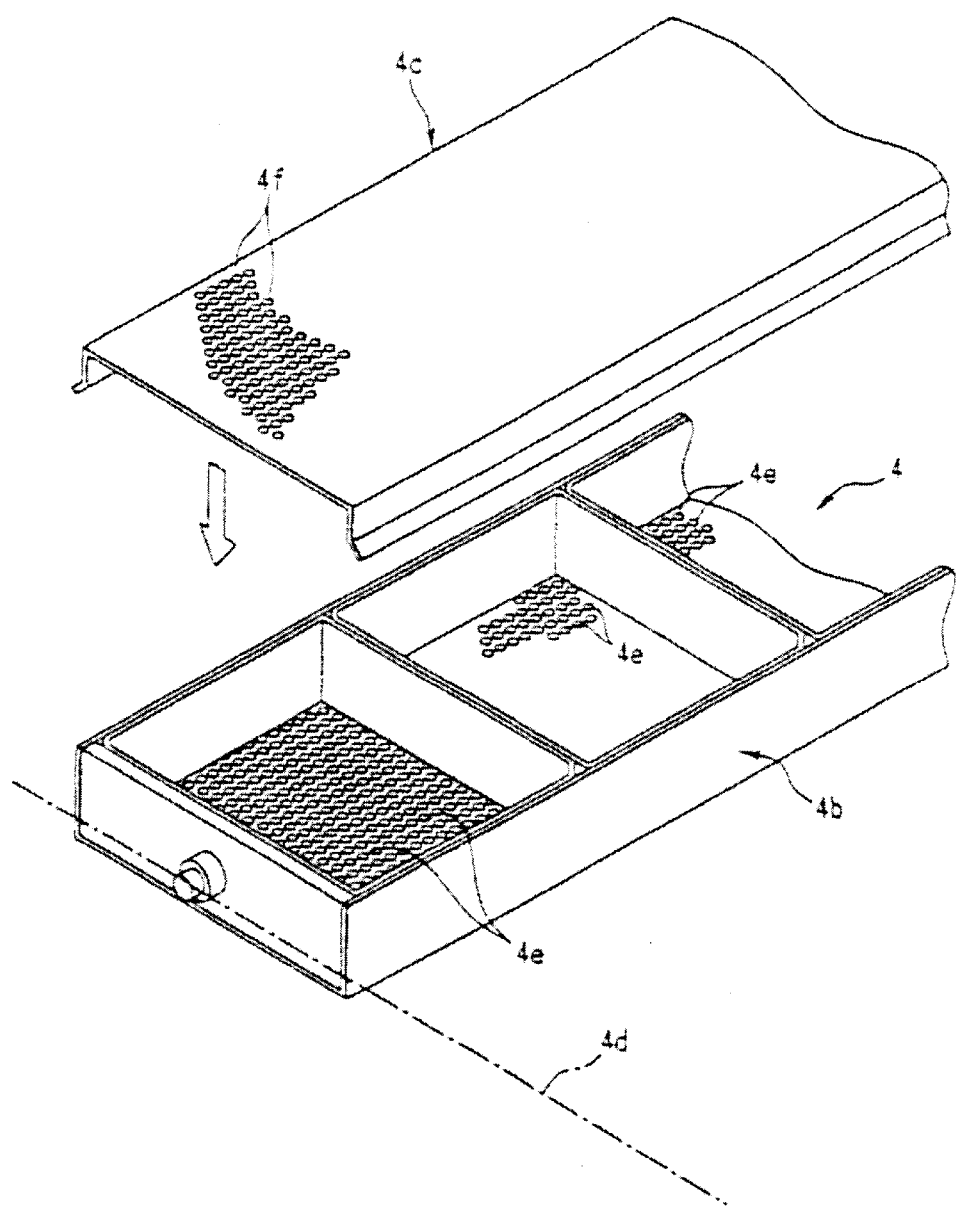
FIG. 6 shows a perspective view of the structure of a conveyor according to the invention.

The fourth drying chamber $D_4$ shown in FIG. 1 and FIG. 2 also has a similar structure to that of this second drying chamber $D_2$. Here, the conveyor 4, as illustrated in FIG. 6, has a structure comprising a plurality of baskets 4b accommodating noodle ribbons within, a lid 4c covering the top opening of each of the baskets 4b and conveying chains 4d each connecting the ends on one side or the other of the baskets 4b in their lengthwise direction to move them from one end to the other of the hot air drying apparatus 2 in its lengthwise direction. Each of the baskets 4b and the lids 4c has many hot air flow ports 4e and 4f.

Next, a drying method for noodle ribbons using the hot air drying apparatus 2 of the foregoing configuration will be described below.

As noodle ribbons mounted on and carried by the conveyor 4 enter the first drying chamber $D_1$, a heated air flow generated by the heater 6 of the first drying chamber $D_1$ is delivered by the blower fan 8 downwards in the chamber as a hot air flow. The hot air flow fed in from the air duct 10, after being streamlined into a primary laminar state, is delivered out towards above the conveyor 4. The hot air flow delivered out towards above the conveyor 4 hits the plurality of air flow receiving plates 18a through 18f of the streamlining section 12 and, while its flow rate is controlled, reaches the whole top face of the air velocity control plate 16 in a uniform air density. The hot air flow moving towards the air velocity control plate 16 is controlled in velocity by its passage through the plurality of slits 14 of the air velocity control plate 16 and, while being streamlined into a secondary laminar state, is blown over the noodle ribbons on the conveyor 4 from above. Thus, even though the hot air flow delivered from the blower fan 8 is in a turbulent state, it is streamlined into the primary laminar state by its passage of the air duct 10, and optimally controlled in flow rate and velocity and streamlined into the secondary laminar state by its passage of the streamlining section 12, and this streamlined hot air flow is uniformly blown over the noodle ribbons mounted on the conveyor 4 from above to dry them.

As the noodle ribbons carried by the conveyor 4 move into the second drying chamber $D_2$ after passing the first drying chamber $D_1$, the heated air flow generated by the heater 6 of the second drying chamber $D_2$ is delivered by the blower fan 8 into the lower part of the chamber as a hot air flow. The hot air flow fed into the air duct 20, after being streamlined into the primary laminar state within the duct, is delivered to underneath the conveyor 4. The hot air flow delivered to underneath the conveyor 4 hits the plurality of air flow receiving plates 18a through 18f of the streamlining section 12 and, while its flow rate is controlled, reaches the whole bottom face of the air velocity control plate 16 in a uniform air density. The hot air flow moving towards the air velocity control plate 16 is controlled in velocity by its passage through the plurality of slits 14 of the air velocity control plate 16 and, while being streamlined into the secondary laminar state, is blown over the noodle ribbons mounted on the conveyor 4 from underneath. Thus, even though the hot air flow delivered from the blower fan 8 is in a turbulent state, it is streamlined into the primary laminar state by its passage of the air duct 20, and optimally controlled in flow rate and velocity and streamlined into the secondary laminar state by its passage of the streamlining section 12, and this streamlined hot air flow is uniformly blown over the noodle ribbons mounted on the conveyor 4 from underneath to dry them. Here, even though the noodle ribbons are blown by the hot air flow from underneath, the lid 4c of the conveyor 4 securely keeps the noodle ribbons from floating.

As the noodle ribbons carried by the conveyor 4 move into the third drying chamber $D_3$ after passing the second drying chamber $D_2$, a hot air flow in a laminar state is uniformly blown on the noodle ribbons from above in the same way as in the first drying chamber $D_1$, and the drying of noodle ribbons is accomplished in the fourth drying chamber $D_4$ in the same way as in the second drying chamber $D_2$ and in the fifth drying chamber $D_5$ in the same way as in the first drying chamber $D_1$.

As described above, the hot air drying apparatus 2 in this mode of carrying out the invention can produce instant noodles of high quality, which are free from uneven drying and whose ribbon texture is uniform and fine, because a hot air flow in a laminar state at the optimal flow rate and velocity is blown on noodle ribbons, mounted on and carried by the conveyor 4, for a prescribed period of time uniformly from above and for another prescribed period of time, again uniformly, from underneath and the drying by such blowing of a heated air flow is repeated alternately from above and underneath.

The hot air drying apparatus 2 has a configuration having a plurality of drying chambers $D_1$, $D_2$, $D_3$, $D_4$, $D_5$ and so forth which the conveyor 4 continuously passes, each drying chamber being provided with a heater 6, a blower fan 8, an air duct 10(20) and a streamlining section 12. As a heated air flow controlled by the air duct 10(20) and the streamlining section 12 of each drying chamber in a laminar state at the optimal flow rate and velocity is blown on noodle ribbons mounted on and carried by the conveyor 4, the heated air flow can be controlled with high precision.

Further, as the noodle ribbons mounted on and carried by the conveyor 4 are dried by consecutive passage of the plurality of drying chambers $D_1$, $D_2$, $D_3$, $D_4$, $D_5$ and so forth, the manufacturing efficiency of instant noodles does not deteriorate, and the workability can be substantially enhanced. Moreover, as it is made possible to form the air ducts 10 and 20 and the streamlining section 12 in simple configurations, and furthermore the hot air flow in a laminar state can be generated by the air ducts 10 and 20 and the streamlining section 12 with high precision at the optimal flow rate and velocity, the cost of the apparatus can also be reduced.

Although in this embodiment the heater 6 and the blower fan 8 are arranged in the upper part of each of the drying chambers $D_1$, $D_2$, $D_3$, $D_4$, $D_5$ and so forth, this arrangement does not limit the essentials of the present invention.

Nor is the number of drying chambers $D_1$, $D_2$, $D_3$, $D_4$, $D_5$ and so forth limited to that stated in this embodiment.

While the conveyor 4 in this embodiment has a structure in which noodle ribbons are contained in the baskets 4b and covered with the lids 4c while being conveyed, a similar advantage can be achieved by using a structure in which noodle ribbons are mounted on, for instance, a net conveyor on which a hot air flow is blown up to prevent the noodle ribbons from floating.

The air duct 10 and 20 and the streamlining section 12 in this embodiment correspond to the hot air flow streamlining device referred to in the claims of the invention.

As hitherto described, by the hot air drying method for noodles as set forth in claim 1, the drying temperature, air flow rate and air velocity are set optimally, a laminar flow of hot air is generated, and a step to blow the hot air flow so generated uniformly on the noodle ribbons to be dried from above and a step to blow the hot air uniformly on the noodle ribbons from underneath are alternately repeated to dry the noodle ribbons for a prescribed drying period, instant noodles of high quality, which are free from uneven drying and whose ribbon texture is uniform and fine, can be manufactured.

With the hot air drying apparatus for noodles as set forth in claim 2, as the hot air flow streamlining device of each drying chamber blows a hot air flow streamlined into a laminar flow and set to the optimal air flow rate and velocity for drying uniformly on the noodle ribbons from above or underneath, the hot air flow can be controlled with high precision.

Furthermore, as the drying of conveyor-fed noodle ribbons is completed in a short period of time by consecutively passing a plurality of drying chambers, the manufacturing efficiency of instant noodles does not deteriorate, and the workability can be substantially enhanced.

Also, according to the invention, the optimal temperature, air flow rate and velocity for drying can be set and a hot air flow to be streamlined into a laminar state can be generated with high precision by a hot air flow streamlining device of a simple configuration. Therefore the cost of the apparatus can also be kept to a relatively low level.

What is claimed is:

1. A hot air drying apparatus for noodles, wherein a plurality of drying chambers which conveyor-fed noodle ribbons consecutively pass are arrayed, each drying chamber being provided with a heater to heat air therein to generate a heated air flow; a blower for feeding said heated air flow so generated as a hot air flow of a uniform air flow rate and velocity; and a hot air flow streamlining device for streamlining the hot air flow fed by the blower into a laminar state, setting it to the optimal air flow rate and velocity for drying and blowing the flow uniformly on said noodle ribbons, in each pair of adjacent drying chambers the hot air flow streamlining device of one drying chamber blowing said hot air flow on said noodle ribbons from above and that of the other drying chamber blowing said hot air flow on said noodle ribbons from underneath, and said hot air flow streamlining device comprises an air duct for streamlining the hot air flow fed by said blower into a primary laminar state and leading it towards above or underneath the widthwise direction of said conveyor; and a streamlining section for setting the hot air flow led by this air duct towards above or underneath the widthwise direction of the conveyor to the optimal air flow rate and velocity for drying, and controlling it into a laminar flow to be uniformly blown on said noodle ribbons.

2. The hot air drying apparatus for noodles, as set forth in claim 1, wherein said air duct is a box-shaped body having an inlet for taking in said hot air flow from said blower and an outlet opening to above or underneath the widthwise direction of said conveyor, this box-shaped body having within it stratifying plates extending from said inlet to said outlet.

3. The hot air drying apparatus for noodles, as set forth in claim 1, wherein said streamlining section has an air velocity control plate in which a plurality of slits are formed in parallel to one another in a direction orthogonal to the moving direction of said conveyor and a plurality of fixed air flow receiving plates rising from said air velocity control plate and spanning over said plurality of slits, and said plurality of air flow receiving plates are so shaped that the air receiving area of the air flow receiving plate in the closest position to said air duct be made the smallest by reducing its height and the air receiving area of each succeeding air flow receiving plate be gradually expanded as the distance of the plate from said air duct increases by gradually increasing its height, so that the hot air flow from said air duct, as it hits each air flow receiving plate, be set to the optimal flow rate, uniformly led towards the face of said air velocity control plate and, by passing said slits, controlled to the optimal velocity to be blown on said noodle ribbons.

* * * * *